United States Patent [19]
Silberg et al.

[11] 3,715,539
[45] Feb. 6, 1973

[54] FLUID LEVEL MONITORING SYSTEM

[75] Inventors: Paul A. Silberg, Cochituate; John R. Lewis, Cambridge, both of Mass.

[73] Assignee: Harnessed Energies, Inc., Newton, Mass.

[22] Filed: Dec. 10, 1970

[21] Appl. No.: 96,765

[52] U.S. Cl. ............200/84 C, 335/205, 73/313, 200/61.2
[51] Int. Cl. ............................................H01h 36/02
[58] Field of Search ............200/84 C, 61.2; 73/313; 335/205

[56] References Cited

UNITED STATES PATENTS

| | | | |
|---|---|---|---|
| 2,448,251 | 8/1948 | Campbell | 200/84 |
| 2,810,036 | 10/1957 | Mejean | 200/84 |
| 3,114,478 | 12/1963 | Hilkemeier | 200/84 C |
| 2,927,175 | 3/1960 | Booth et al. | 200/84 C |
| 3,471,664 | 10/1969 | Hansen | 200/84 C |

Primary Examiner—Robert K. Schaefer
Assistant Examiner—M. Ginsburg
Attorney—Richard P. Crowley and Richard L. Stevens

[57] ABSTRACT

A fluid monitoring system wherein a float having a permanent magnet is disposed in a chamber containing fluid therein. The magnet is disposed on the bottom of the float. A hollow tube passes through the lower portion of the chamber and is sealed in a fluid-tight manner at either end thereof. A magnetic reed switch is disposed in the tube and is connected to a circuit which provides a visual indication when the reed switch is actuated. If the level of the fluid in the chamber decreases to a predetermined level, the float level decreases solely as a function of the fluid level in the chamber. The magnetic field created by the permanent magnet when adjacent the reed switch disposed in the tube in the chamber will actuate the switch which provides a visual indication that the predetermined lower level has been reached. If the level of fluid in the chamber increases, the float moves upwardly as the liquid level increases, the magnet moves away from the reed switch, and the indicator would be deactivated.

5 Claims, 5 Drawing Figures

PATENTED FEB 6 1973 3,715,539

INVENTORS
PAUL A. SILBERG
JOHN R. LEWIS
BY Crowley & Stevens
ATTORNEYS

FLUID LEVEL MONITORING SYSTEM

BACKGROUND OF THE INVENTION

Many systems and apparatus are available today to automatically indicate the level of a fluid in a sealed, pressurized environment. One method employed is a bubbler system wherein the fluid level is displaced by a separate fluid, such as air, and the degree of displacement related to fluid level, or is detected by means of an air pressure switch giving the required off-on indication. In another method a float rides on a fluid surface and over or through mechanical linkages a switch is activated. In either electromagnetic or acoustical methods, energy is introduced into the container and the adsorption, reproduction, or transmission of this energy is electrically monitored. All of these methods have certain disadvantages. The bubbler system introduces an additional parameter or analysis intermediary, such as the air pressure and the additional combination of an air force to maintain pressure, and further an air sensitive switch to detect it. Therefore, the number and extension of components that must withstand the internal pressure is increased. In the float system wherein the float is connected to mechanical linkage, the float is not solely responsive to the fluid level and additional error is therefore introduced since the float must physically act against some mechanical linkage or lever. The electromagnetic and acoustical methods introduce complexity and additional elements intermediate the actual level of the liquid in the container and the ultimate analogue or digital reading.

SUMMARY OF THE INVENTION

Our invention is directed to a fluid level monitoring system wherein a float which rides upon the fluid interface has a permanent magnet secured thereto. A switching or indicating mechanism, such as a reed switch, external to the fluid containing vessel is activated by the magnetic field of the permanent magnet when the fluid is at a predetermined level. The invention eliminates the problems of other liquid level indicating systems for containers particularly pressurized containers wherein the only intermediary between the fluid level and the switch is the float position. The float position is solely responsive to the fluid level in that the movement of the permanent magnet secured thereto actuates a switching mechanism which is external to the container. The forces acting on the float are solely those required just necessary to keep it located or buoyant. That is, other than the fluid level there are substantially no forces which act directly on the float which would inhibit or vary its movement in relation to the liquid level. Further, there is no requirement for either a mechanical or electrical feed or connection through the container wall to some external switching mechanism. Also, the float level indication or switching mechanism used is essentially unaffected by the pressure or temperature within the container.

DESCRIPTION OF THE PREFERRED EMBODIMENTS

Figure 1:
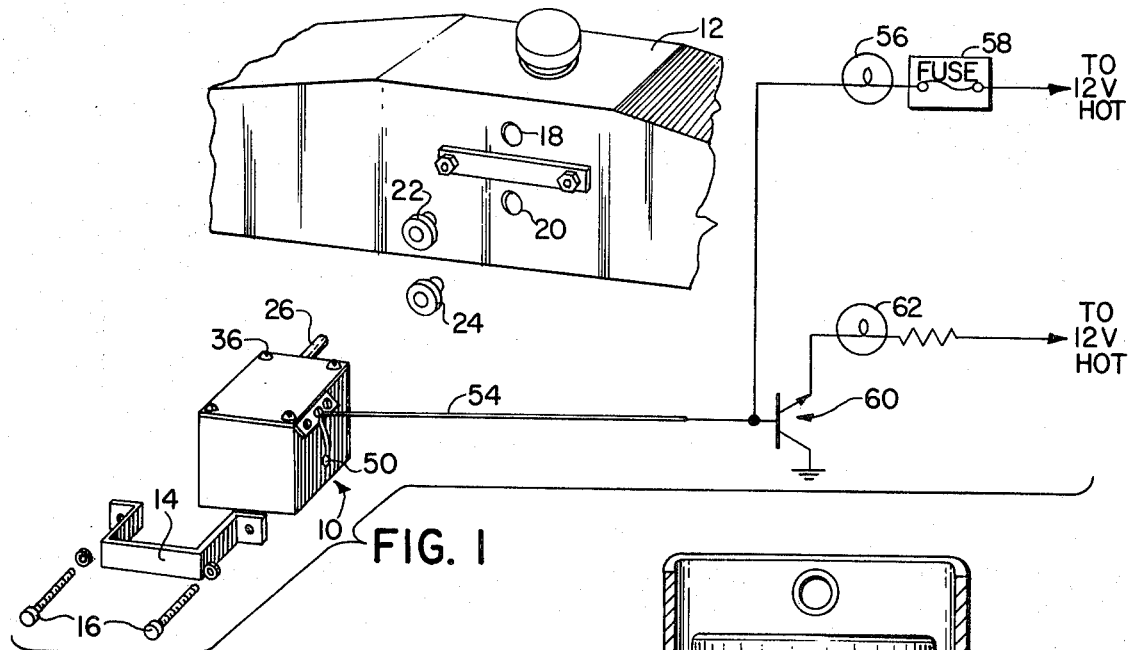
FIG. 1 is a perspective illustration of our invention employed to measure the liquid level in a closed, pressurized system, such as a radiator in combination with a schematic illustration of the wiring system.

Referring to FIG. 1, the telescopic perspective view shows the invention 10 in combination with a closed, pressurized fluid-containing system such as a radiator 12. The fluid level monitor 10 is secured to the radiator 12 by strap 14 through nuts 16 as shown and as will become more apparent later in this particular embodiment, the center line of the nuts are substantially in line and generally parallel to the low level mark at which it is desired to indicate that the fluid in the radiator has reached its predetermined level where a warning signal is desired. To provide fluid flow communication between the monitor and the fluid level of the radiator which it is monitoring upper and lower orifices 18 and 20 are provided in the radiator 12. As shown, step bushings 22 and 24 are adapted to be received by orifices 18 and 20 and to receive conduits 26 and 28 of the monitor, see FIG. 4, to provide fluid-tight seals therebetween.

Figure 2:
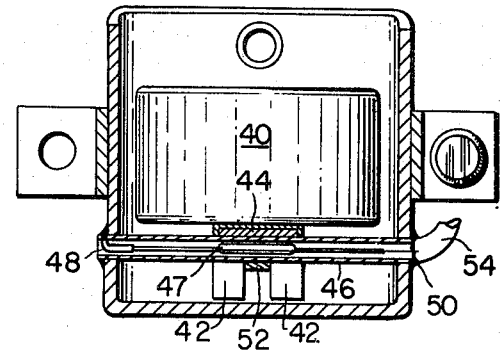
FIG. 2 is a back view the embodiment of FIG. 1.
Figure 3:
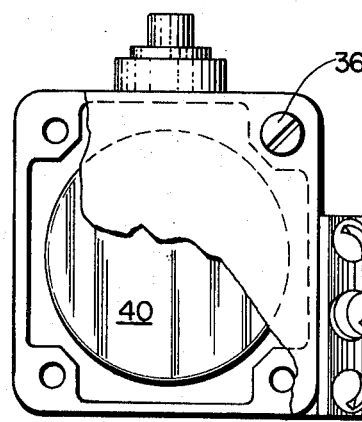
FIG. 3 is a top view of the embodiment of FIG. 1.
Figure 5:
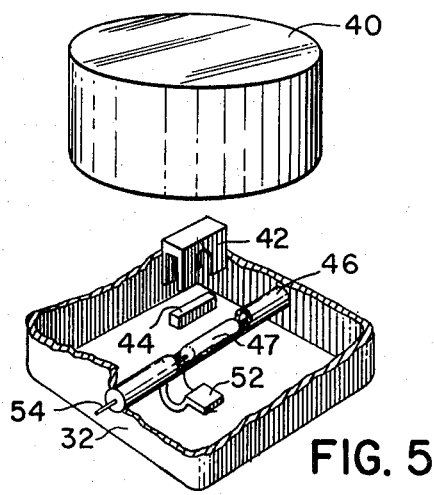
FIG. 5 is a perspective partly broken away view of the embodiment of FIG. 1.
Figure 4:
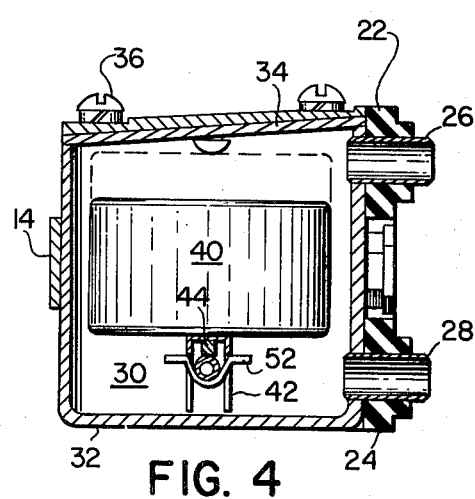
FIG. 4 is a side view of the embodiment of FIG. 1.

The fluid level monitor 10 is shown in greater detail in FIGS. 2, 3, and 4. A chamber 30 into which and from which the fluid from the radiator may flow is defined by the box-shaped container 32 in combination with the cover-like element 34. As shown in FIG. 4, the conduits 26 and 28 are disposed on the front wall of the container 32. The cover element 34 is secured to the container through screws 36 at the four corners thereof.

Disposed within the chamber 30 is a cylindrical-type float 40 and secured to the bottom of the float is a vertical float guide 42 and a permanent magnet 44. A tube 46 passes through the lower portion of the chamber and into and through the side walls of the container 32 as shown most clearly in FIG. 2. The tube 46 is engaged to the walls of the container in a fluid-tight manner such as by braising or welding. Disposed within the tube is a mechanism responsive to the magnetic field of the magnet 44, such as a reed switch 47, for example a switch manufactured by Hamlin Incorporated, identified as type Mini-2-115. Of course, other reed switches known to those in the art may also be employed. Preferably, one end of the tube within which the reed switch is disposed is sealed such as end 48 and the reed switch grounded therein. The other end of the tube 50 remains open to the atmosphere and the other lead end of the switch passes therethrough. Secured to the external surface of the tube 46 is a cross clip 52 which controls the lateral movement of the float within the chamber.

An insulated lead wire 54 from the tube then may communicate with any type circuitry for indicating the liquid level as desired. Referring again to FIG. 1, a schematic or circuit for a low power indicator is illustrated in FIG. 1 wherein the current generated by the magnet actuating the reed switch flows through the indicator 56 which is in combination with the fuse 58 and in turn which is in electrical communication with the 12 volt power supply of the vehicle. If a high power indicator is required, then referring again to FIG. 1 and the schematic, the current will pass through the transistor 60 and then to the indicator 62 as shown. If desired, a relay may be employed in lieu of the transistor 60.

The operation of our invention will be described in reference to its employment with a closed, pressurized container. More specifically, the unit will be used to determine when the fluid level in a radiator reaches or falls to a predetermined level. Referring to FIG. 1, the monitor 10 is secured to the radiator as shown whereby the fluid in the radiator may flow through conduit 28 into the chamber 30. Air bubbles or excess fluid which may enter the chamber 30 are allowed to exit through the conduit 26 back into the radiator. The assembly 10 is secured to the radiator in a fixed manner by the strap 14. The lead wire 50 from the reed switch 47 is in communication with the indicator 56 such as a lamp indicator and in serial relationship with the fuse 58 which is in electrical communication with the 12-volt power supply of the vehicle. The assembly 10 is secured to the radiator 12 in such a manner that the reed switch is disposed slightly below the minimum level at which the indicator is to be actuated. When the fluid in the radiator is at its normal level, the float 40 will rise to its position shown in the dotted lines in FIG. 4. In this position the float guide 42 is such that the ends are still about the outer wall of the tube 46 whereby the float 40 remains in horizontal alignment. Further, the cross clip 52 still engages the tines on the float guide 42 when the float 40 is in its uppermost position to prevent vertical movement of the float. This ensures that the magnet 44 secured to the bottom of the float 40 is always in substantially parallel relationship with the reed switch 47 as shown in FIGS. 2 and 4.

Since the level of the float at the fluid interface corresponds to the level of the fluid in the radiator, as the level of fluid in the radiator decreases, either through leakage or evaporation, the float will move downwardly as guided in its position by the float guide 42 and cross clip 52. As the magnet 44 such as a Hamlin Inc. switch-type H–31–604, approaches the reed switch 47, the magnetic field received by the reed switch increases and when it reaches a predetermined level such as about 30 gauss the reed switch is actuated wherein a current of about 110 milliamps flows to the indicator 56 actuating the indicator. Of course, the strength of the magnetic field and the current from the reed switch will vary depending upon the material and components used. As described, for this embodiment the float will just about be resting on the outer surface of the tube when the switch is actuated. This visual indication may be observed and steps taken to correct the level of fluid in the radiator.

In an alternative embodiment, the reed switch could be placed in the upper portion of the chamber, the magnet disposed on the top of the float. Under normal conditions the switch would be engaged. When the fluid level fell, the switch would disengage. In this embodiment, depending upon how wired the magnet, actuating the switch in the normal upper position could or could not give a signal.

Although the invention has been described in particular reference to the employment of a magnetic reed switch in combination with a magnet to provide an off-on indication, a variable indicator or switch responsive to an increasing magnetic field may be employed, such as a Hall effect device. In this manner the changes in signal could be evaluated over an entire range and could be read out on an electrometer or an operational amplifier calibrated in the reading desired. In this embodiment, the degree of fluid level being monitored could be measured in degrees over a range.

Another embodiment when employing the off-on concept of the magnetic reed switch would be to have a series of switches responsive to the movement of the magnet whereby off-on indications could be given for various levels such as high, normal, and low. For example, three or more reed switches could be disposed on the side of the container 32 either within or without the chamber 30. A single magnet could be employed which magnet would be adapted to pass through the entire distance defined by the first and last reed switches. The magnet could be secured to the side of the float 40 and when in its uppermost position actuate a first switch through circuitry similar as shown and indicating a full or high position. As the fluid level in the radiator and the float 40 dropped corresponding thereto, a second reed switch on the wall spaced apart and downwardly from the first would be actuated to indicate a normal level. If the fluid level in the indicator continued to drop, then the float would correspondingly continue to drop and could actuate a third reed switch spaced apart and downwardly from the second whereby the third reed switch would be actuated to give an off-on indication, such as to indicate a low or undesirable level.

One of the features of the invention is the relationship of the inside moving magnet to an external mechanism adapted to be actuated without physical interconnection between the two. Although the reed switch has been shown as disposed in the chamber, even though isolated from the conditions within the chamber, it may be disposed on the outside of the chamber. For example, for a structure similar to that as shown in FIGS. 2, 3, and 4, the wall tube 46 could be secured on the outer wall of the bottom of the container-like device 32, or it could be secured on the inner wall of the bottom of the chamber 32 rather than spaced apart therefrom as shown in the preferred embodiment. Similarly, the physical placing of the switching mechanism external to the chamber may comprise a series of off-on indications as previously described or may include a variable type response wherein the range or degree of fluid level may be monitored continuously.

The preferred embodiment has been described wherein the float and switch are in a chamber separate from the radiator in which radiator the fluid level is being monitored. This has been done to minimize the effect of turbulence in the area where the float is caused by the fluid flow through the radiator and the rolling and rocking motion of the vehicle.

Also, for convenience of installation, the separate chamber is preferred. It is to be understood that when monitoring a fluid level the float may be placed directly in the vessel with or without appropriate guide means.

Although described in combination with a permanent magnet and a reed switch responsive to the magnetic field thereof, other self-contained sources of energy or magnetic energy may be used. For example, in a large installation it may be desirable, rather than to use a permanent magnet, to use an electromagnet having a self-contained power system. Also, other sources of self-contained energy may be used. The preferred embodiment has been described in reference to the utilization of a reed switch responsive to the magnetic field of the permanent magnet. Other devices which may be used in lieu thereof would include other magnetic circuits, as are well known, which are responsive to magnetic fields. The permanent magnet may be any convenient shape or size and if elongated in shape may be perpendicular to or at any angle to the bottom surface of the float.

Although described for measuring the fluid level in a radiator, the invention also finds employment in measuring the fluid level in any container such as a pressurized, closed container, one in which although not pressurized or closed may be such that the fluid is difficult to measure because of inaccessability, or for any fluid measuring system as desired. For example, it may be used to indicate liquid levels in a sump pump, etc. Further, the float has been shown at the fluid interface and cylindrical in shape. The float may any shape and may be partially submerged or fully submerged as long as it is buoyant and responsive to the fluid level in which it is disposed.

Having described our invention, what we now claim is:

1. In a fluid level indicator for monitoring the fluid level in a radiator or similar vessel wherein a housing is secured to the radiator, the housing having inlet and outlet conduits and a float chamber, the conduits providing fluid flow communication between the chamber and the radiator, a float disposed in the chamber and having a magnet secured thereto, a switch disposed within the housing and adapted to be actuated by the magnet, the improvement which comprises:

means to prevent the rotative movement of the float in the float chamber regardless of the position of the float in the chamber.

2. The indicator of claim 1 where the magnet is an elongated magnet disposed on the bottom of the float, the switch disposed within the housing is a reed switch, and the means to prevent the rotative movement of the float ensures that the magnet remains orientated substantially parallel to and centered over the reed switch.

3. The indicator of claim 1 wherein the means to prevent the rotative movement of the float includes first guide means disposed on the float and second guide means disposed within the housing, the first and second guide means adapted to form a mating assembly to prevent rotative movement of the float.

4. The indicator of claim 1 wherein the first guide means includes a float guide disposed on the bottom of the float, the guide having tines extending downwardly;

the second guide means includes a cross clip having extending horizontal arms, said clip secured to the switch, the arms of the cross clip received in the opening defined by the tines of the float guide.

5. In a fluid level indicator for monitoring the fluid level in a radiator or similar vessel wherein a housing is secured to the radiator, the housing having inlet and outlet conduits and a float chamber, the conduits providing fluid flow communication between the chamber and the radiator, a float disposed in the chamber and having an elongated magnet secured to the bottom thereof, a reed switch disposed in the bottom of the housing and adapted to be actuated by the magnet, the improvement which comprises:

a first guide disposed on the bottom of the float, a second guide secured to the housing in the lower part of the chamber, the first and second guides forming a mating assembly to prevent rotative movement of the float within the chamber whereby the elongated magnet remains substantially parallel to and centered over the reed switch.

* * * * *